(12) United States Patent
Micallef et al.

(10) Patent No.: US 12,050,895 B2
(45) Date of Patent: *Jul. 30, 2024

(54) METHOD AND SYSTEM FOR CHANGING THE BEHAVIOR OF A CONNECTED FIELD DEVICE

(71) Applicant: RedLore Canada Inc., Dunrobin (CA)

(72) Inventors: David Micallef, Rabat (MT); Niek Van Dierdonck, Dunrobin (CA)

(73) Assignee: RedLore Canada Inc., Dunrobin (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/134,224

(22) Filed: Apr. 13, 2023

(65) Prior Publication Data

US 2023/0244460 A1 Aug. 3, 2023

Related U.S. Application Data

(63) Continuation of application No. 17/408,689, filed on Aug. 23, 2021, now Pat. No. 11,693,640, which is a continuation of application No. 16/817,660, filed on Mar. 13, 2020, now Pat. No. 11,126,414.

(51) Int. Cl.
*G06F 8/41* (2018.01)
*G06F 9/48* (2006.01)
*H04L 67/2871* (2022.01)
*H04L 67/565* (2022.01)

(52) U.S. Cl.
CPC ............ *G06F 8/447* (2013.01); *G06F 9/4881* (2013.01); *H04L 67/2871* (2013.01); *H04L 67/565* (2022.05)

(58) Field of Classification Search
CPC ... G06F 8/447; G06F 9/4881; H04L 67/2823; H04L 67/2871
USPC .................................................. 717/136–167
See application file for complete search history.

(56) References Cited

U.S. PATENT DOCUMENTS

| | | | |
|---|---|---|---|
| 6,341,372 B1 | 1/2002 | Datig | |
| 7,802,238 B2 * | 9/2010 | Clinton | .............. G05B 23/0213 |
| | | | 717/136 |
| 8,464,227 B2 * | 6/2013 | Clinton | ..................... G06F 8/51 |
| | | | 717/136 |
| 8,595,234 B2 | 11/2013 | Siripurapu et al. | |
| 9,535,663 B2 | 1/2017 | Yaseen et al. | |
| 9,641,580 B2 | 5/2017 | Zhou et al. | |
| 10,783,241 B2 | 9/2020 | Crabtree et al. | |
| 2006/0026281 A1 | 2/2006 | Hodgson et al. | |

(Continued)

OTHER PUBLICATIONS

Windh, Skyler, et al. "High-level language tools for reconfigurable computing." Proceedings of the IEEE 103.3 (2015): pp. 390-408. (Year: 2015).*

(Continued)

*Primary Examiner* — Satish Rampuria
(74) *Attorney, Agent, or Firm* — Stratford Group Ltd.

(57) ABSTRACT

A method and a system for programming one or more behavior of a field device connected to a network comprising an input programming language to define the one or more behaviors to create an input program, transmitting over the network the input program to a translator coupled to the field device, translating the input program to generate a field program comprising a plurality of tasks and executing said field program by an executor coupled to said field device.

14 Claims, 5 Drawing Sheets

(56) References Cited

U.S. PATENT DOCUMENTS

| | | | |
|---|---|---|---|
| 2007/0011334 | A1 | 1/2007 | Higgins et al. |
| 2008/0189689 | A1 | 8/2008 | Tramontana et al. |
| 2009/0243840 | A1 | 10/2009 | Petite et al. |
| 2013/0339473 | A1 | 12/2013 | McCaffrey et al. |
| 2014/0059524 | A1* | 2/2014 | Kee .................... G06F 8/49 717/154 |
| 2017/0041304 | A1 | 2/2017 | Tal et al. |
| 2017/0134536 | A1 | 5/2017 | Tessiore et al. |
| 2017/0178626 | A1 | 6/2017 | Gruber et al. |
| 2019/0213498 | A1 | 7/2019 | Adjaoute |

OTHER PUBLICATIONS

Trois, Celio, et al. "A survey on SDN programming languages: Toward a taxonomy." IEEE Communications STrois, Celio, et al. "A survey on SDN programming languages: Toward a taxonomy." IEEE Communications Surveys & Tutorials 18.4 (2016): 2687-2712. urveys & Tutorials 18.4 (2016): pp. 2687-2712. (Year: 2016).*

De Michell, Giovanni, and Rajesh K. Gupta. "Hardware/software co-design." Proceedings of the IEEE 85.3 (1997): pp. 349-365. (Year: 1997).*

Mery, Dominique, and Neeraj Kumar Singh. "Automatic code generation from Event-B models." Proceedings of the second symposium on information and communication technology. 2011 .pp. 179-188 (Year: 2011).

Peng, Shih Sen, and Meng Chu Zhou. "Ladder diagram and Petri-net-based discrete-event control design methods." IEEE Transactions on Systems, Man, and Cybemetics, Part C (Applications and Reviews) 34.4 (2004): pp. 523-531. (Year: 2004).

An, Yameng, et al. "OntoPLC: semantic model of PLC programs for code exchange and software reuse." IEEE Transactions on Industrial Informatics 17.3 (2020): pp. 1702-1711 (Year: 2020).

Kim, Dong-Hun, Jan K. Sykulski, and David A. Lowther. "A novel scheme for material updating in source distribution optimization of magnetic devices using sensitivity analysis." IEEE Transactions on Magnetics 41.5 (2005): pp. 1752-1755 (Year: 2005).

Hong, Sang Gi, Nao Soo Kim, and Taewook Hao. "A smartphone connected software updating framework for IoT devices." 2015 International Symposium on Consumer Electronics (ISCE). IEEE, 2015.pp. 1-2 (Year: 2015).

Nemeth, Zoltan A., and Donald J. Migletz. "Accident characteristics before, during, and after safety upgrading projects on Ohio's rural interstate system." Transportation Research Record 672 (1978): pp. 19-23. (Year: 1978).

Balasubramanian, Krishnakumar, et al. "Developing applications using model-driven design environments." Computer 39.2 (2006): pp. 33-40. (Year: 2006).

Erich, Floris, and Marc Arden. "Reactive programming using procedural parameters for end-user development and operations of robot behavior control." (2018). pp. 1-99 (Year: 2015).

Kusunoki, Kazuhiro, et al. "A corba-based remote monitoring system for factory automation." Proceedings First International Symposium on Object-Oriented Real-Time Distributed Computing (ISORC'98). IEEE, 1998 .pp. 1-7 (Year: 1998).

Mujica, Gabriel, et al. "On-the-fly dynamic reprogramming mechanism for increasing the energy efficiency and supporting multi-experimental capabilities in WSNs." IECON 2013—39th Annual Conference of the IEEE Industrial Electronics Society. IEEE, 2013 pp. 5455-5460 (Year: 2013).

Kachman, Ondrej, and Marcel Balaz. "Firmware update manager: A remote firmware reprogramming tool for low-power devices." 2017 IEEE 20th International Symposium on Design and Diagnostics of Electronic Circuits & Systems (DDECS). IEEE, 2017 pp. 88-91 (Year. 2017).

Evers, Leon, Paul Havings, and Jan Kuper. "Dynamic sensor network reprogramming using sensorscheme." 2007 IEEE 18th international symposium on personal, indoor and mobile radio communications. IEEE, 2007 pp. 1-5 (Year: 2007).

Search report from corresponding international application No. PCT/CA2021/050263, mailed May 18, 2021.

* cited by examiner

METHOD AND SYSTEM FOR CHANGING THE BEHAVIOR OF A CONNECTED FIELD DEVICE

CROSS-REFERENCE TO RELATED APPLICATION

This application is a continuation of U.S. patent application Ser. No. 17/408,689, filed Aug. 23, 2021, now allowed, which is a continuation of U.S. patent application Ser. No. 16/817,660, filed Mar. 13, 2020, now U.S. Pat. No. 11,126,414, which is hereby incorporated by reference herein in its entirety.

BACKGROUND

The number of electronic devices in the world is growing rapidly. A lot of this growth falls under the umbrella term Internet-of-Things (IoT), however devices that do not naturally resort under the IoT umbrella are also proliferating. As a result, both the personal, public and working environments around us are furbished with more and more electronic devices that are communicating via one or more communication protocols.

The devices interact with their environment in numerous ways, many of which use sensors to measure physical properties of the environment, such as temperature, relative humidity, air pressure, light level, sound level, etc. or otherwise exert an action on their environment using an actuator such as turning a motor, sounding a buzzer or blinking a light. These devices are being used in a wide variety of applications such as workplace occupancy management, HVAC management, supply chain management, manufacturing, logistics, home security etc.

The term 'field device' is used herein to represent any electronic device that has the following characteristics (but not limited to). As depicted in FIG. 1, the field device 102 interacts with an environment 114 via zero or more sensors 110 and/or zero or more actuators 112, for example. by sensing physical properties (e.g. measuring temperature) and/or exerting a physical action to be performed in the environment (e.g. switching on a light) based on a program 104 executed by a processor (not shown) located on the field device 102. The field device 102 has the ability to exchange data 108 via a network with a terminal 106, such as for example a computer or smartphone. The data exchange 108 can use any data communication protocols known in the art, including a combination of different network protocols. The field program 104 states a set of rules or behaviors to interact with the environment 114 as well as the set of rules to communicate with the terminal 106. The term program includes, but not limited to, algorithms, analytics, machine learning and artificial intelligence.

In FIG. 2, the field device 102 interacts with an intermediate server 202. The server 202, can be one or more, cloud-based server/s (non-local) or a local workstation/s or on-premise server/s. The server 202 exchanges information with one or more terminal 106.

The field device 102 is generally not directly connected to the terminal 106. The communication may occur through several network layers, possibly interconnected through gateways. The terminal 106 or server 202 may exchange data with one or more field device 102.

The field program 104 may be as simple as passing on properties measured from the environment to the terminal 106 or server 202 on a predefined schedule to the terminal 106. It may also be as simple as exerting an action on the environment as instructed by a message received from the terminal 106 or server 202. The field program 104 may also be more complex and conduct transformations on the data rather than only transmitting data. The field program 104 may also transform the measured or received data into transformed data and store some or all of the measured, received and the transformed data in a local memory (not shown) embedded within the field device 102 for later use.

For example, the program may trigger a sensor 110 on the field device 102 to take a temperature measurement every minute, the field program 104 stores these measurements in local memory until 15 minutes have passed, after 15 minutes calculates the average of the 15 measurements and finally the field program 104 sends the calculated average to the terminal 106 or server 202.

As per FIG. 3, some functionality may fully or partially reside in a server program 302 running on the server 202 and/or the terminal program 304 running in the terminal 106. This means that the functionality is distributed over several sub-programs.

The field program 104 is generally installed within the field device 102 by the manufacturer. Often product designers integrated the capability to configure parameters, within the field program, remotely. This allows such parameters to be changed when the device is in the field. As an example of configurability, the field program 104 may implement the functionality to send a message to the terminal 106 or server 202 as soon as the temperature has reached a configurable threshold. In this same example enabling or disabling the sending of a message upon breaching the threshold may also be configurable.

The configuration of the field device 102 may sometimes be carried out locally on the field device 102 through a local interface (e.g. a Bluetooth® connection to a smartphone upon which a matching app is installed). The configuration may also be carried out remotely by using the data exchange 108 channel that connects the field device 102 and the terminal 106 or server 202.

The availability of processing power and memory in the field device 102 is rapidly increasing, thereby allowing for more complex field program 104 than previously possible. These complex programs could previously only be executed outside of the field device 102, such as in the terminal 106 or server 202 or other computers indirectly connected to the field device 102 or the terminal 106.

Given the recent availability of increased processing power and memory within the field device 102, application developers now have a broader range of choices as to where to execute the functionality required by the application: either in the terminal 106 or server 202, referred herein as cloud-computing, or on the field device 102, referred herein as edge-computing or split the functionality into a part cloud-computing and a part edge-computing. The choice of where to execute the functionality affects the effectiveness and efficiency of the applications and can enable a large number of other applications which are simply otherwise not technically or economically viable.

Most applications need to pass through several development iterations before reaching a stable status. The development of cloud-computing functionality (e.g. on a cloud-based server or on a local server of workstation), has significant advantages during product development and refinement because of its accessibility during development, quick response times and significant computational and memory resources. In addition, the developer's workstation is often fundamentally very similar to a server environment. As a consequence, moving the functionality from the development environment to the operational environment is straightforward, sometimes as simple as copying the functionality from one environment to the other. Using cloud-computing approach, updates can be pushed instantly and with minimal risk and downtime. So cloud-computing development allows for easy and fast functionality iterations without compromising the field devices.

As an example, an application is developed to average the temperature value measured by a temperature sensor on a field device. The average temperature is calculated over 600 measurements, one measurement taken every second and averaged out over 10 minutes.

In a cloud-computing approach, the field device 102 sends a temperature measurement every second to the terminal 106 or server 202 who calculates the 10-minute average. In a slightly more optimized solution, the field device 102 buffers several measurements, e.g. 60, and sends these measurements together to the terminal 106 or server 202 every minute, for a total of 10 messages for every 10-minute interval.

In edge-computing field device 102 process the raw data and generates processed data. In the above example, the field device 102 would locally store 600 temperature values for 10 minutes, at the end of the 10 minutes calculate the average and send only the average to the cloud.

Cloud-computing has several serious disadvantages:
1. At the cloud-side only data can be processed which was sent to the field device 102 in the first place. Any data that was not sent out is lost forever and cannot contribute to the value of the application. E.g. if the developer also wants to have the humidity data from the field device, it may not be sent to the cloud in the first place so it cannot be made available.
2. To (partially) alleviate the previous disadvantage, developers sometimes opt to send out as much raw data as possible to the cloud-computing, to avoid missing data that could have value during the cloud-computing. Such a heavy data load reduces the maximum amount of the field devices 102 that can be deployed in an application because the limitations of the data exchange function 108, a limitation which e.g. can be the shared nature of the network capacity. In addition, it requires the field device 102 to transmit these large amounts of data, which consumes power, and can severely limit the useful lifetime of a field device 102 if it is battery powered, which it often is.
3. Some networks make it impossible to send out all the raw data at a high sampling rate. To give an example, a Long Range (LORA) based IoT device would typically be allowed less than 1 transmission per hour and an average of 20 bytes in each transmission. This is because these networks are designed to carry small amounts of information with long intervals without data in between. (These limitations come from both the network's protocol design and the power required to transmit the data). It would thus be impossible for a field device 102 of this kind to send temperature readings every second as required by the example put forward above.
4. Some sensors, which are integrated in field device 102, generate so much raw data that the capabilities of the field device 102 and the data exchange 108 capacity are simply too limited to send out and transmit all the raw data for cloud-computing. In these cases, a cloud-computing approach does not offer a solution at all. Examples of such data-intensive sensors are accelerometers and microphones.
5. Introducing cloud-computing applications is not always technically possible or desirable and even when it is, it introduces more complexity and cost. Indeed, some applications will need to operate without cloud-computing entities present.

Elaborating on the previous example, two years after the initial deployment of the field device 102, the requirements change in such a way that continuously calculating temperature averages in no longer required. The new requirement introduces a rule that the average temperature only needs to be known when the temperature has risen above 10 degrees. If this event does not occur, then the data is of no practical use. The cloud-computing program can be changed by filtering the temperature data coming from the field device in accordance with the new rule. However, as the field program 104 was unchanged, it will keep on sending averages every 10 minutes, regardless of the relevance according to the new rule. This approach is suboptimal in terms of network utilization and power consumption on the field device 102.

The cloud-computing approach serves the needs of the developer at the cost of optimizing the application performance. As explained above, the alternative to cloud-computing is edge-computing, i.e. processing the data locally in the field device 102 and only sending the results of such processing to the terminal 106 and/or server 202.

Edge-computing alleviates some of the problems of cloud-computing. Edge-computing can reduce the data content to reduce the need for transmission energy and network capacity as described in items 2 and 3 above. Yet in the scenario pictured above it does not yet give access to data which was not part of the field program 104 in the first place, as described in item 1 above. In fact, the edge-computing approach as discussed has worsened the situation: it makes creating changes to the processing algorithm more difficult than in a cloud-based approach. Indeed, the field device 102 is programmed to execute a pre-defined field program 104. In the example above the pre-defined program consist of: (a) the use of temperature data (and not the other data that could possibly be gathered on the field device), (b) the use of an averaging function, (c) the 1-second temperature sampling period, (d) the data collection for 600 seconds, etc.

Edge-computing does not solve the cloud-computing problem described under item 1 above: upon a change of the functionality requirements it does not automatically give access to data which was not part of the edge-program in the first place. In fact, the edge approach as discussed has worsened the situation: it makes creating changes to the processing algorithm more difficult than with cloud-computing. Indeed, the field device is programmed to execute a pre-defined program.

The act of developing a field program is very different from that of developing cloud-computing program for a server or a terminal. The tools (programming languages, development environments, optimization tools, databases . . . ) used to develop cloud-computing programs can often rely on powerful computational resources such as large computer memories, fast processing speeds and abundant energy. The field device 102 has none of these characteristics: it has limited memory, processing capability and often runs on very limited battery power. As a result, the tools for cloud-computing program development are very different. In addition to a difference in tools, the development paradigms are very different. The developers in charge of developing the functionality into a program are usually proficient in the cloud-computing approach. However, they are usually not proficient with the edge-computing approach. As a result, they need to rely on other professionals, typically embedded software engineers, to translate the intended functionality into a field program 104.

One existing approach to modifying an edge-computing field program 104 requires the use of field device 102 with enough computational and memory resources to run a full-fledged operating system, (for example, a Raspberry Pi running Linux operating system). These devices are usually electric-grid powered and connected to the internet via a high-speed and high-bandwidth connection and have ample resources to run the program within a software container or process running on top of an operating system. Such operating systems have built-in program or container updating capabilities. A special software termed the orchestrator is then used to update the container within the field device. This kind of technology does not work in resource constrained field device 102, as it requires too much network bandwidth and/or requires said operating system and thus cannot be used in low-cost battery powered devices.

Another existing approach to modifying an edge-based field program 104 is to remotely update the firmware on the field device. In this case, firmware is all or a large part of software residing on the field device 102 which can include the communication system, the boot loader, etc., and of which the field program 104 is only a subset. A firmware update is an update of all or a large part of the firmware present on the device.

The possibility and means of doing a remote firmware update depend, mostly, on the type of network and bandwidth of the network. Long range, low bandwidth networks make it a difficult and power intensive operation, putting an extra load on the battery. Another drawback of a remote firmware update is that it bears an inherent risk of 'bricking' the device: If the new firmware contains a fault that impedes any further communication, the device remains non-functional until a corrective on-site firmware update or a device replacement is performed happen, which is a serious costly risk. If the faulty remote firmware update happened site-wide, as updates are often broadcasted to a full network at once, then the effect of such a fault can be dramatic. A further problem with this approach is that updating firmware can be data intensive and hence significantly deplete the battery of a battery-operated field device 102. A final disadvantage exists in systems where the fee for utilizing the network is a function of the size of the data exchanged. As firmware often has a large data content, this approach will be penalized by a high cost. For these reasons, this approach is not favored and is only used as a last resort.

Another existing approach, if a remote firmware update is not possible or desired, is to organize a firmware update locally (on site) at the device. This is sometimes not possible because the device can't be accessed, e.g. when a building is occupied and service interventions are not welcomed or when the device is mounted in a place that is hard to access, e.g. in an elevator shaft. In addition, for cost and size reasons many field devices 102 lack the ability to be locally updated.

Another existing approach requiring local on-site access consists of changing out the field device 102 for a new one altogether. This approach is flawed in all the ways the previous approach is and in addition requires replacement devices, which can be costly.

Aside from the approaches mentioned above the most common strategy in the state-of-the-art is to implement a feature whereby the solution allows for new configuration data to be sent to a field device or to multiple field devices at once. The configuration data is interpreted by the field device 102 and subsequently changes or influences the field device's program. The limitation of this approach is that the scope of changes that can be achieved is limited by the structure of the configuration data and the configurability already built-in to the field program 104. E.g. the configuration structure may allow for a temperature threshold to be configured, but it may not sport the ability to enable the sending of humidity measurements. This structure is typically defined in the development stage and is limited to what is deemed required or useful at that time. This means that, once a field device is installed, if the configuration data structure does not support a particular capability, there is no way to achieve the desired change except resorting to one of the previously described methods, with all their disadvantages. In conclusion this approach solves the inherent inefficiencies of server-based processing with a configuration-based edge-processing. Yet it brings along the new and significant disadvantage of being highly inflexible.

There is a need for a method that alleviates the cloud-computing disadvantages by moving to edge-computing, yet the method should not have the disadvantages traditionally associated with edge-computing.

There is a need for a method that allows the developer to develop a field program 104 efficiently, i.e. within the paradigm he understands and using tools familiar to him.

There is a need for a method to allow updating the field device within the capacity limitation of network on which the data exchange to the field device takes place. Typically, these networks are constrained in data capacity, so the method should allow for updating the field program while using only limited network capacity.

There is a need for a method to allow updating the field device within the energy limitations of the field device 102.

BRIEF SUMMARY

In one embodiment, a method is disclosed for programming one or more behavior of a field device connected to a network comprising using an input programming language to define said one or more behaviors to create an input program, transmitting over said network said input program, translating said input program to generate a field program comprising a plurality of tasks, executing said field program by an executor coupled to said field device.

In another embodiment, said field device comprises one or more actuators and/or one or more sensors controlled using one or more core functions when the executor executes on one or more of said tasks.

In another embodiment, said executor schedules one or more tasks for execution at a future time based on one or more rules provided by said field program.

In another embodiment, said executor schedules one or more tasks for execution at a set or recurring future time based on one or more rules provided by said field program.

In another embodiment, said executor schedules one or more tasks for execution at occurrence of a specific event based on one or more rules provided by said field program.

In another embodiment, said translator is located on said field device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
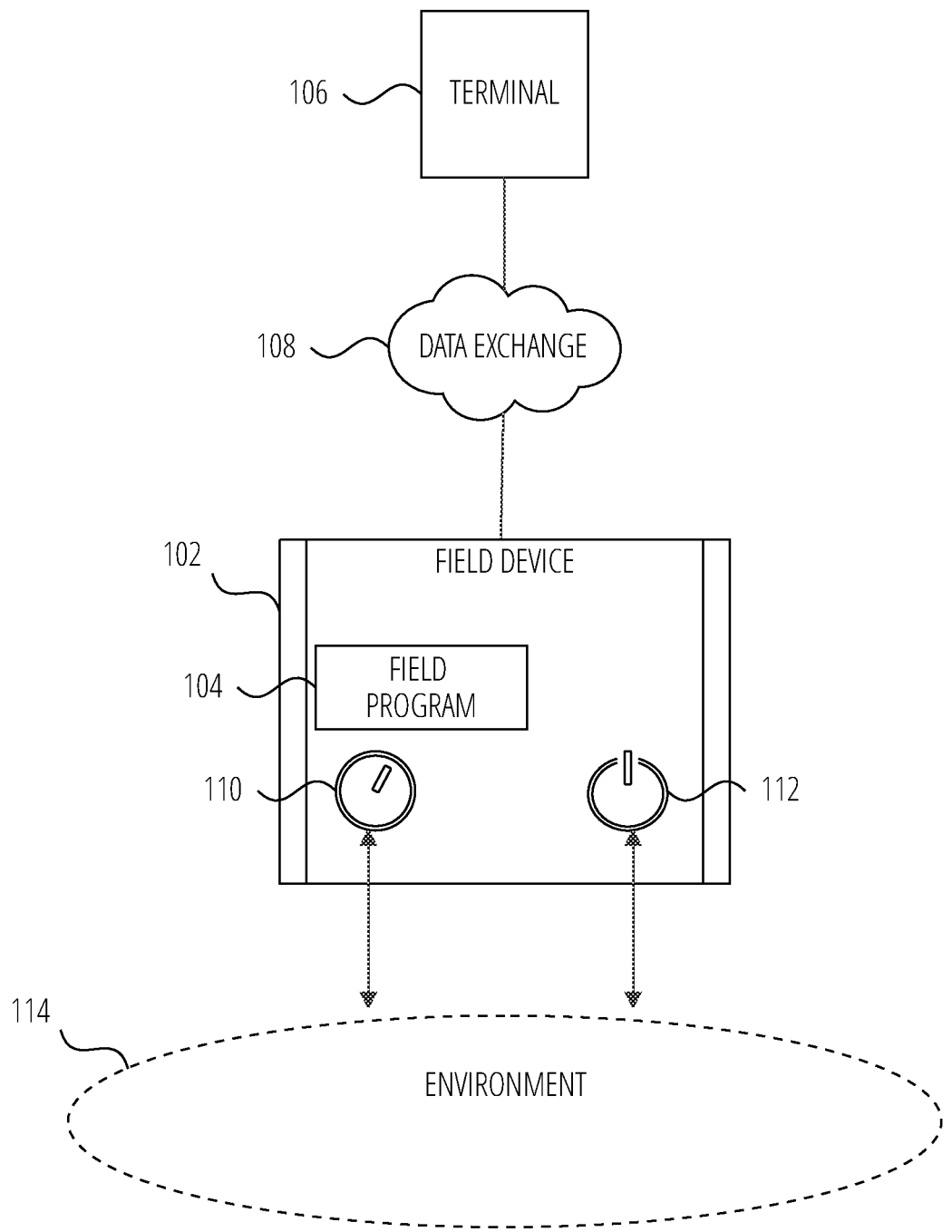
FIG. 1 illustrates an application with field devices in communication with a terminal.
Figure 2:
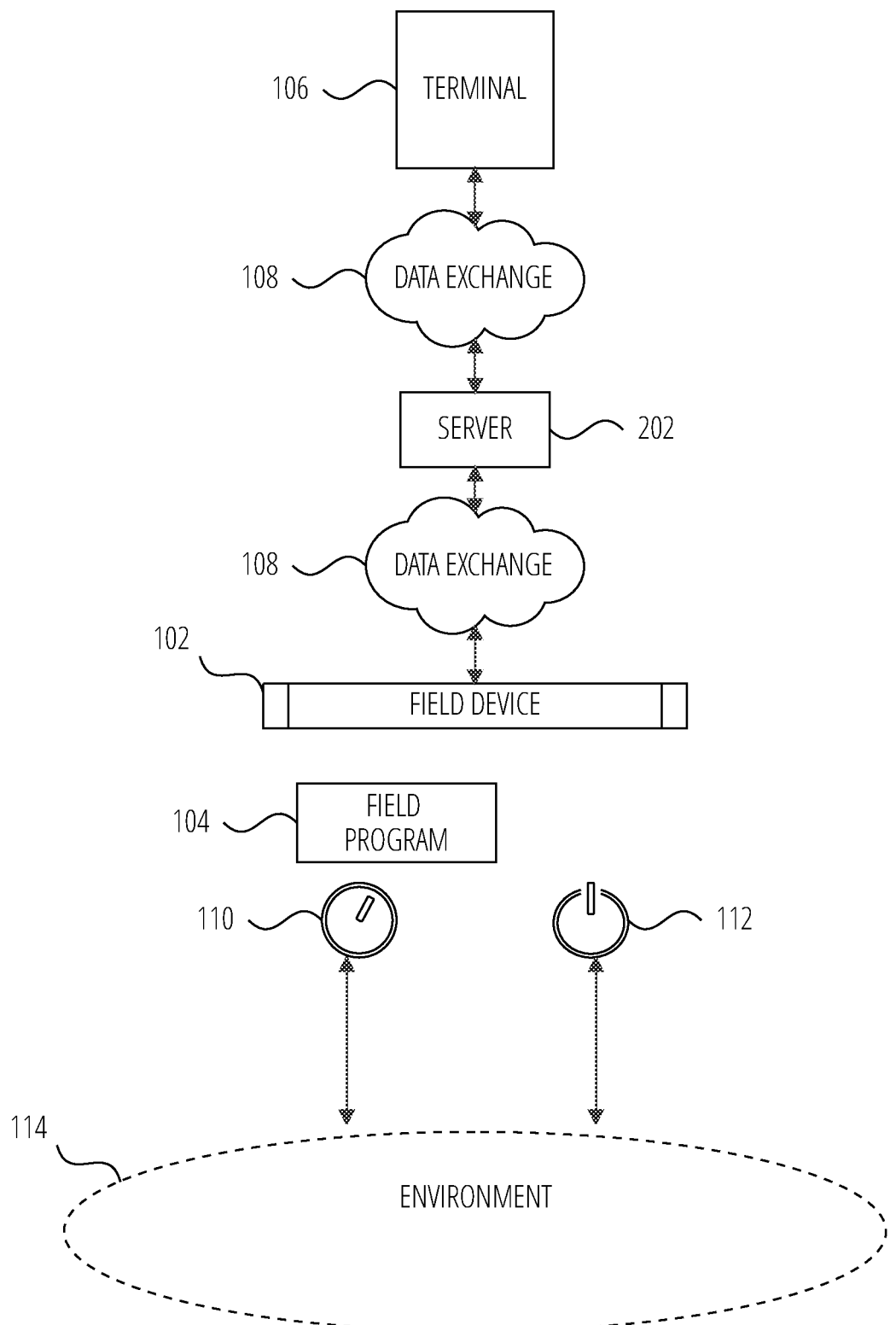
FIG. 2 illustrates an application with field devices in communication with a terminal and a server.
Figure 3:
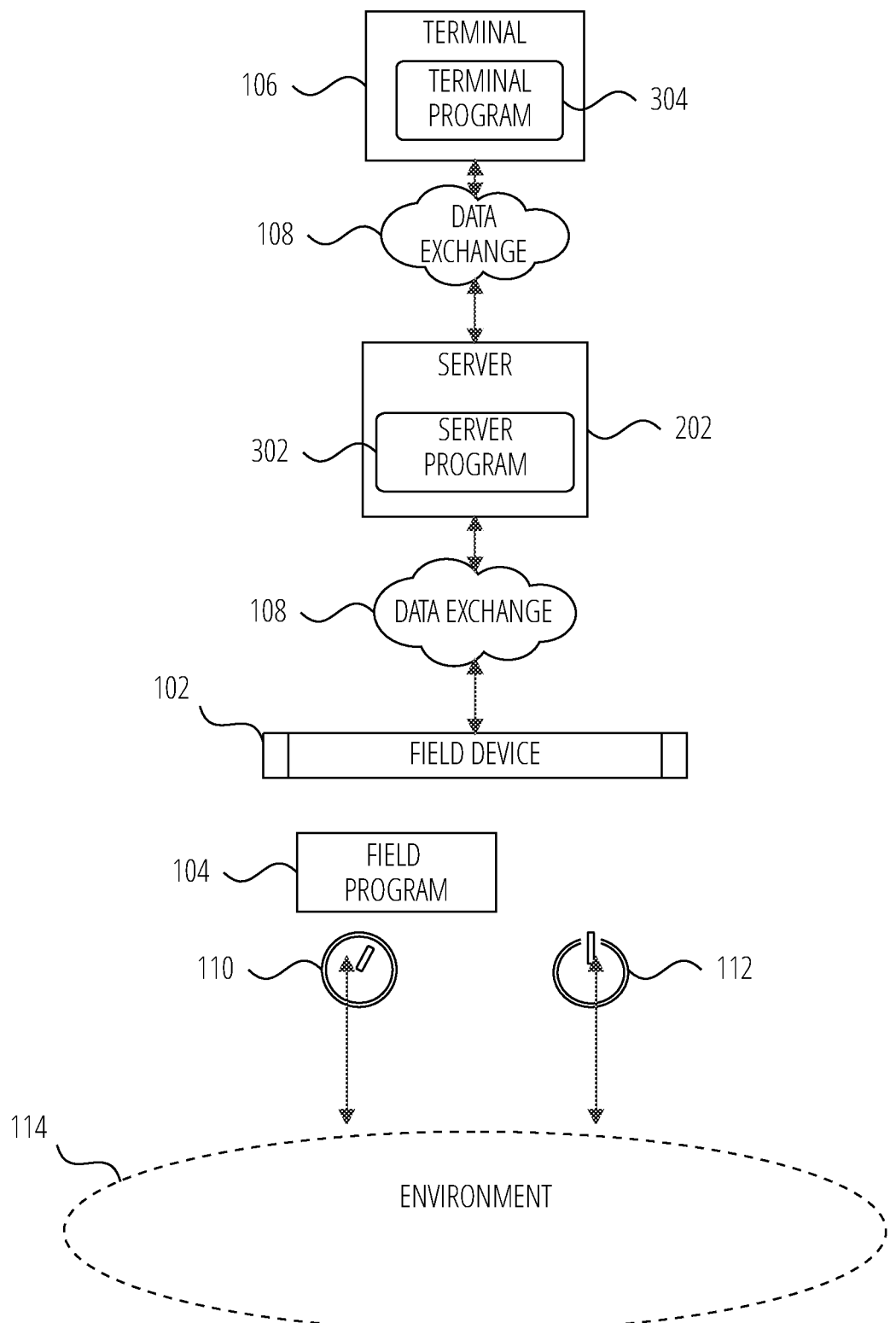
FIG. 3 illustrates an application with field devices in communication with a terminal and a server where the program is distributed.
Figure 4:
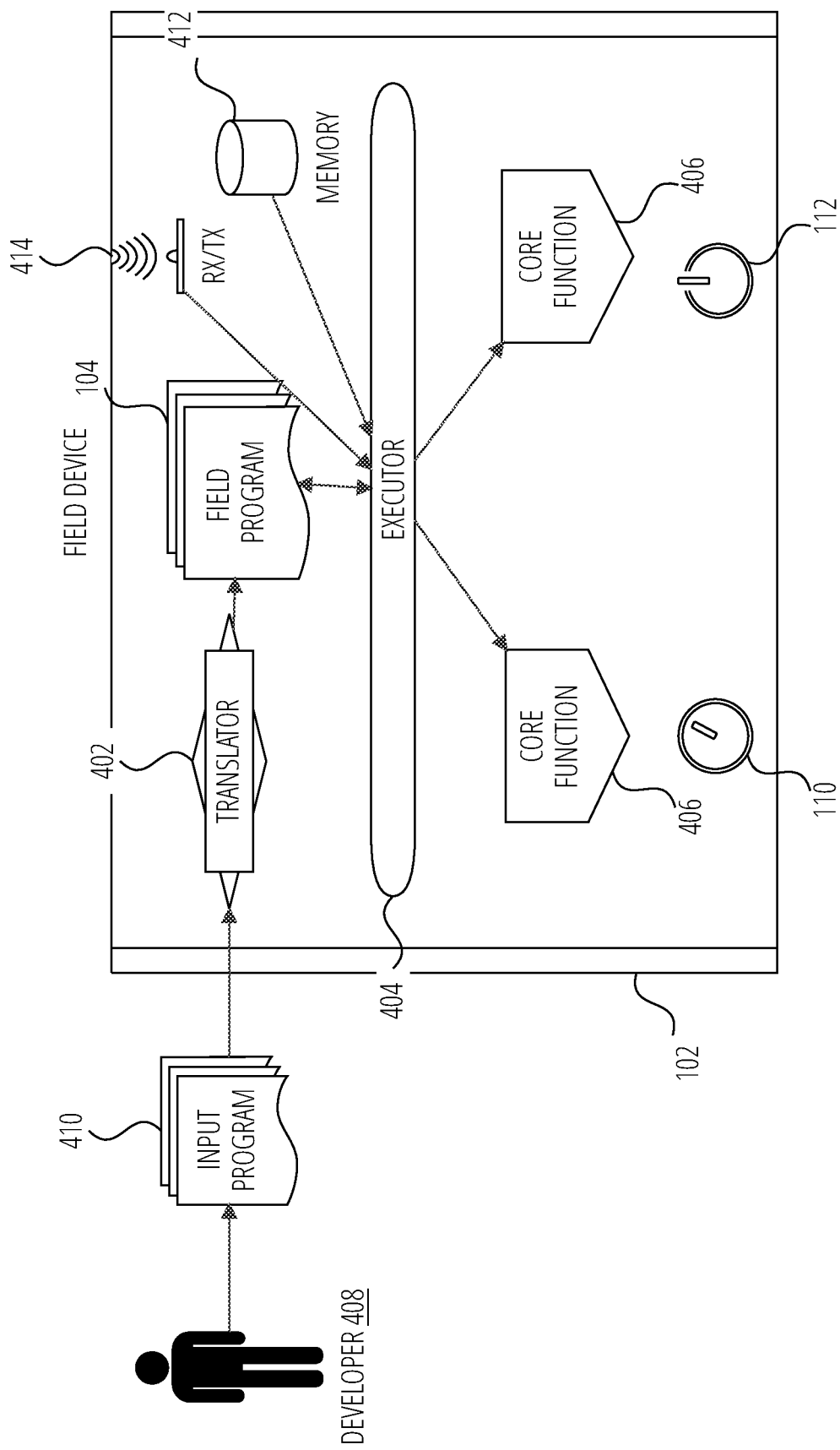
FIG. 4 illustrates a field device update method in accordance with one embodiment.

As per FIG. 4, certain capabilities within a field device 102 are inherent to the hardware on the field device 102 these are referred herein as the core functions 406. As an example, the way a device interacts with a sensor 110 or actuator 112 will not change throughout the lifetime of the IoT device because its dictated by the hardware itself. Given that these core functions 406 do not need to change, the embodiment focuses on creating a method to program the behavior of how such core functions should be used in a field device 102 to create the necessary functionality. There can be one or more core function 406 per sensor 110 and/or actuator 112 or one core function 406 can drive a plurality of sensors 110 and/or actuators 112.

In a first embodiment, a developer 408 creates an input program 410 using a programming language. The input program is transmitted to a translator 402 on the field device 102 which converts the input program into a set and/or sequence of tasks to be performed or scheduled by an executor 404. The executor 404 executes the tasks, schedules tasks for execution or recurring execution. It may use memory 412 to store data and may communicate with the receiver and transmitter 414 of the field device to receive commands or transmit data.

To keep with the temperature example, the software required to interface and read the temperature from a sensor is a typical core function 406. This function will not change throughout the lifetime of the IoT device and is considered as 'static' within the device. On the contrary, the frequency (aka sampling rate) at which the temperature is read and when should the temperature be read is dynamic and might change throughout the lifetime of the sensor. The programming language is used by the developer to define the 'when' and 'at what rate' should the temperature sensor be read on the field device 102. Other examples may be far more complex than this example but relate to programming how the device makes use of the core functions available.

In this embodiment, when the field program 104 of the field device 102 needs to change, it can be achieved by simply sending a new input program 410 to the translator 402, which in turns generates the list of tasks or field program 104 to the executor 404 on the field device 102. The executor will replace its existing field program 104 with the new field program 104 and execute any new behavior defined by the tasks. The executor itself, however, does not have to change and neither will any other part of the field device's firmware, such as the core functions.

Programming Language

The programming language is designed such that it follows the paradigm known to the developer who is familiar with the cloud-computing approach, thereby removing the need for this developer to acquire substantially new skills or pass the development on to professionals familiar with developing for field devices.

The input program is sent to the field device, either through data exchange from a server or terminal over a network or via a local interaction with the field device. The programming language defines the behaviors of the field device 102 at a high level of abstraction and does not define the details of how the field device should execute the statements contained within the program. As a result, the program is small enough to be sent over a low bandwidth and power-deprived network.

The programming language may be of a declarative nature, an imperative nature, or a blend of both. In case the input program 410 has a declarative nature, then the field program 104 may be of a purely declarative nature, an imperative nature or a blend of both. The programming language defines the behavior a field device 102 must accomplish rather than how to accomplish it.

In one embodiment, the input programming language uses the semantics and syntax of declarative Structured Query Language (SQL). It can, for example, use a subset of SQL92, extended with special keywords and functions that facilitate the creation of logic and data streams on field device 102. As an alternative any declarative language can be used as a starting point or a new declarative language can be invented. The declarative language can be extended with keywords that map the elementary processes that a field device is capable of into the language.

The input programming language is used to describe one or more behaviors intended to be executed by the field device 102.

An example of input program 410 based on the above example is:

Select avg(temperature) from sensors group by Date, DATEPART(mi, Date)/10 into network_message In this embodiment, the program language uses the programming paradigm known to the developer and hence makes it efficient for him to develop a program. There is no need for professionals specialized in embedded programming.

Since the programming language, used in the embodiment described herein, does not deal with the core functions and the interaction with the hardware, the language is 'abstracted' from the hardware. This brings a new level of portability across different hardware (IoT devices). A program can work across different IoT devices, in the same network, as long as they all have the necessary hardware to support the intended operation.

Translator

The input program is transmitted to a translator that is invoked as soon as a new program arrives. The translator builds a set of tasks to be executed by the executor. The translator may finish as soon as the program is translated into tasks and then stops executing until a new program has arrived, or the translator may be invoked at various moments in time.

The translator 402 typically resides on of the field device 102 and may include a pre-processor. The pre-processor can raise an alert to the developer in case of incompatibility between input program and field device capabilities.

If a pre-processor is used, an example of pre-processed program 104 corresponding to the above input program:

```
{
"type":"select",
"columns":[{
  "type":"function"
  "function":"avg",
```

-continued

```
        "column":"temperature"}],
    "from":"sensors",
    "groupby":[{
        "type":"Date"
        "part":"Minutes"
        "divider":10}],
    "into":"network_message"}
```

This pre-processed program is then translated into a field program. An example of a field program corresponding to the above example:

Read_temperature(1 second, [accumulate(memory_location(A1)), increment(memory_location(A2)])

Timer(10 minutes,[average(A1,A2, A3), network_message(A3)]

The field program 104 is converted to binary to make it machine readable. The translated field program comprises a set of rules and associated tasks to be executed by the executor and the core functions 406.

Note that the programming language and translated language is not limited to the above commands and syntax.

The field program 104 may define how the field device 102 uses the sensors 110 and actuators 112 which are connected to it, how and when to interact with them. In another embodiment, the input program 410 contains additional behaviors to be performed by the field device 102 in addition to those behaviors already defined previously (the existing behaviors). In another embodiment, the input program 410 removes some existing behaviors to be performed by the field device 102.

In another embodiment, the translator may implement a function to check the input program against the hardware and/or software capabilities of the targeted field device.

In another embodiment, the pre-processor may implement a function to check the syntactic and/or semantic correctness of the input program.

Executor

The executor executes the tasks as generated by the translator. As a task can have a repetitive nature (e.g. sample temperature value every 1 minute), the executor runs continuously or intermittently, possibly with sleep periods between executing tasks. The executor will use the core functions to help executing the tasks. The executor can be considered in some cases as a scheduler that schedules tasks to be performed at a future time or schedule recurring tasks. The scheduler executes certain behaviors according to a statically (time based) or dynamically (event based) defined schedule. For example, measure temperature every second (static), calculate and send average every 10 minutes (static), measure humidity only when temperature is above 25 degrees (dynamic).

The executor 404 may in addition to the hardware-related functions also execute generic computation functions, such as additions, multiplications, averaging, filtering, etc. In another embodiment, the executor may also allow to combine multiple functions into more complex functions.

In this embodiment, the field program 104 defines how the field device 102 interacts with its environment 114 through their core functions 406, which data is exchanged with the terminal 106 or server 202 and which data transformations occur on the field device 102. The executor 404 does not contribute to any of these elements and is hence generic to any possible field program 104. This keep all the flexibility open to change the field device's behavior simply by changing the field program 104.

In another embodiment, the input program 410 and/or field program 104 may implement machine learning and/or artificial intelligence algorithms.

In another embodiment, the executor 404 may have built-in functions that execute machine learning and/or artificial intelligence algorithms.

In another embodiment, the translator may run in a client-server environment

In another embodiment, a security layer is added to ensure proper encryption and authentication of the input program 410 submitted to the translator.

In another embodiment, an automation system manages a program update by using the capabilities of the translator to operate on the input program and subsequently manages the distribution of the output program to the field device 102.

In the prior art, the field program 104 had to take care of the low-level hardware related operations of the field device 102 as well as describe in detail the operations performed on the data. In the embodiment described herein, the burden is shifted to the executor 404 and core functions 406. As a result, the size of the field program 104 is much smaller than the size of the program in the state of the art. The smaller program size makes a remote update much more feasible because it relaxes the need for high network capacity, it required less transmission energy and is costs less in transmission fee.

When the field program 104 is updated, the executor 404 is not modified and neither does any other part of the field device's firmware. So a field program 104 update is performed without touching basic and core functions of the field device such as wireless communication and power management. This limits the risk of 'bricking' or 'disconnecting' the device in the field.

Another advantage in comparison with the configuration approach of the state-of-the art is that the functionality in terms of processing and generated output data flow is not constrained by a predefined configuration structure and can encompass all the functionalities that are possibly supported by the field device's hardware.

Figure 5:
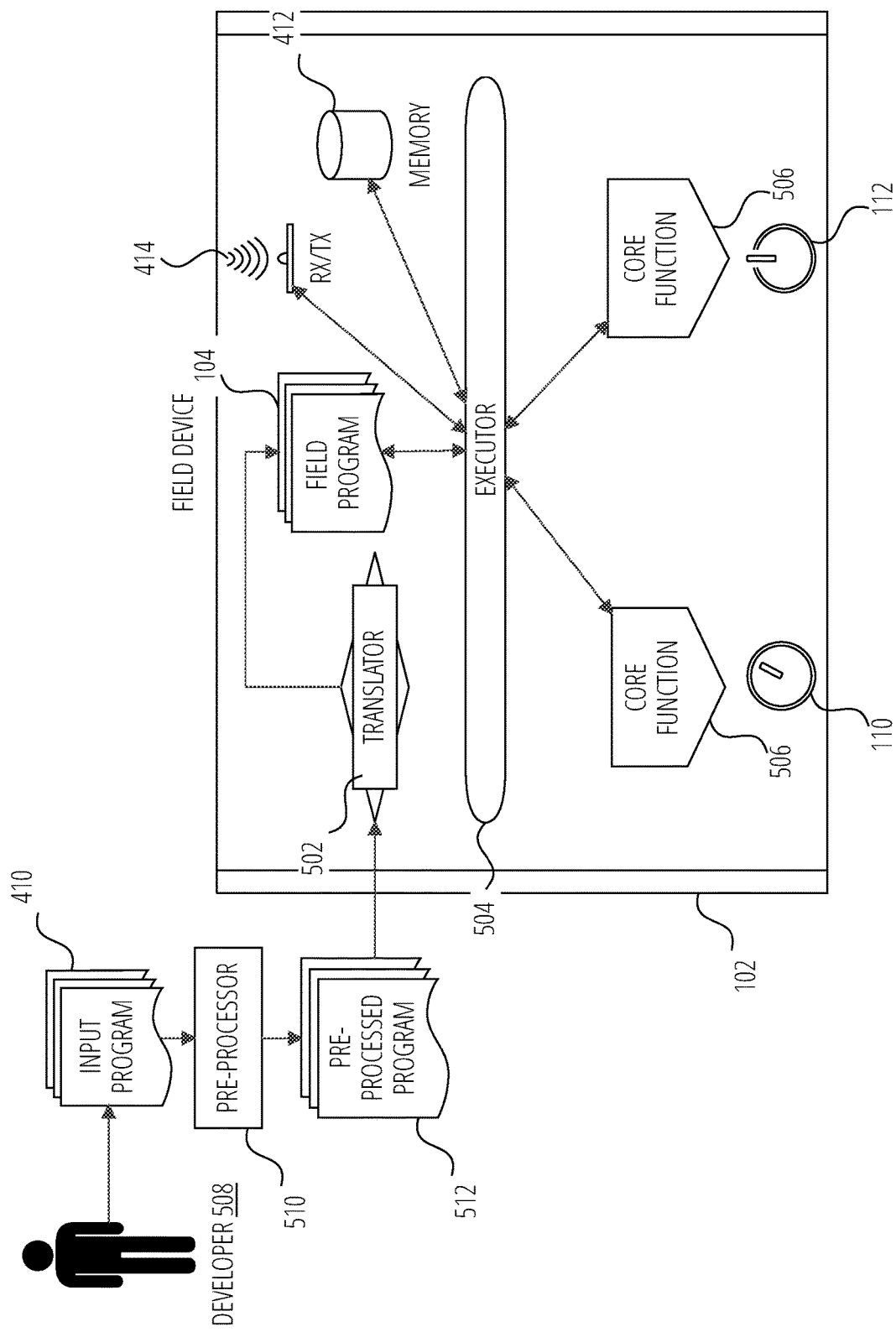
FIG. 5 illustrates a field device update method in accordance with another embodiment.

In another embodiment, as shown in FIG. 5, optionally the invention may add a pre-processor 510 between the developer and the field device, as depicted below.

In this embodiment the pre-processor 510 is located outside of the translator and the field device. It receives the input program from the developer. The pre-processor 510 then executes certain checks and transformations on the program, yielding the pre-processed program 512. The pre-processed program is further fed to the field device and continues to be processed in the same way as in the main embodiment. The pre-processor can, for example, carry out one or more of the following functions:

Compress the program to generate a smaller data size, with the advantage of improving the efficiency in transmission, especially useful when sending over a low bandwidth and power-deprived network.

Check the input program against the hardware and/or software capabilities of the targeted field device. The pre-processor may raise an alert to the developer in case of incompatibility between input program and field device capabilities.

Check the syntactic and/or semantic correctness of the program.

What is claimed is:

1. A computer-implemented method for re-programming a field device connected to a network, comprising:

receiving, by a first processor on the field device, an input program comprising a high-level description of one or more behaviors intended to be executed by the field device;

translating, by a first processor, the input program into a machine-language field program comprising a plurality of associated tasks to be scheduled and performed by the field device in accordance with the one or more behavior; and wherein the method further comprises the steps of, before said receiving:

pre-processing, by a second processor located remotely from said field device and communicatively coupled to the network, the input program; and transmitting, by the second processor via said network, the pre-processed input program to the field device; and wherein said pre-processing comprises the step of:

checking the input program for compatibility between the input program and the field device.

2. The computer-implemented method of claim 1, wherein at least one of said associated tasks relates to the operation of a sensor or an actuator comprised on the field device.

3. The computer-implemented method of claim 1, wherein said pre-processing comprises the step of:

compressing the input program to a smaller size.

4. The computer-implemented method of claim 1, further comprising the step of:

upon detecting an incompatibility between the input program and the field device, the second processor providing an alert.

5. The computer-implemented method of claim 1, wherein said pre-processing comprises the step of:

verifying the input program for syntactic and/or semantic correctness.

6. The computer-implemented method of claim 1, wherein said input program removes existing behaviors to be performed by the field device.

7. The computer-implemented method of claim 1, wherein said executing is done according to a time based or event based defined schedule.

8. A system for re-programming a field device connected to a network, comprising:

a first processor located on said field device;

a non-transitory memory coupled to the processor, the memory storing instructions that when executed by the first processor, configured the system to:

receive an input program comprising a high-level description of one or more behaviors intended to be executed by the field device;

translate the input program into a machine-language field program comprising a plurality of associated tasks to be scheduled and performed by the field device in accordance with the one or more behaviors; and the system further comprising a server located remotely from the field device, the server comprising a second processor communicatively coupled to the network and configured to, before said receiving:

pre-process the input program; and transmit the pre-processed input program to the field device via the network; and wherein said pre-processing comprises the step of:

checking the input program for compatibility between the input program and the field device.

9. The system of claim 8, wherein at least one of said associated tasks relates to the operation of a sensor or an actuator comprised on the field device.

10. The system of claim 8, wherein said pre-processing comprises the step of:

compressing the input program to a smaller size.

11. The system of claim 8, wherein, upon detecting an incompatibility between the input program and the field device, the second processor providing an alert.

12. The system of claim 8, wherein said pre-processing comprises the step of:

verifying the input program for syntactic and/or semantic correctness.

13. The system of claim 8, wherein said input program removes existing behaviors to be performed by the field device.

14. The system of claim 8, wherein said executing is done according to a time based or event based defined schedule.

* * * * *